(12) United States Patent
Maurer et al.

(10) Patent No.: US 7,137,771 B2
(45) Date of Patent: Nov. 21, 2006

(54) METHOD AND DEVICE FOR RECOGNITION OF A LOAD ON A LIFTING GEAR

(75) Inventors: Peter Maurer, Stein (DE); Peter Schulte, Markt Erlbach (DE); Ingbert Strebel, Baiersdorf (DE)

(73) Assignee: Siemens Aktiengesellschaft, Müchen (DE)

(*) Notice: Subject to any disclaimer, the term of this patent is extended or adjusted under 35 U.S.C. 154(b) by 51 days.

(21) Appl. No.: 11/093,029

(22) Filed: Mar. 29, 2005

(65) Prior Publication Data

US 2005/0232733 A1    Oct. 20, 2005

Related U.S. Application Data

(63) Continuation of application No. PCT/DE03/03199, filed on Sep. 25, 2003.

(30) Foreign Application Priority Data

Sep. 30, 2002    (DE)    ................. 102 45 970

(51) Int. Cl.
   *B65F 9/00*    (2006.01)
(52) U.S. Cl. .................. 414/334; 212/275; 212/274; 356/614
(58) Field of Classification Search ........ 356/614–622; 212/274–275, 270, 276; 396/515; 414/334
   See application file for complete search history.

(56) References Cited

U.S. PATENT DOCUMENTS

| | | | | |
|---|---|---|---|---|
| 4,893,922 A | * | 1/1990 | Eichweber | .................. 356/3.12 |
| 5,491,549 A | | 2/1996 | Wichner et al. | |
| 5,878,896 A | * | 3/1999 | Eudier et al. | .............. 212/270 |
| 5,967,347 A | * | 10/1999 | Miyata et al. | .............. 212/286 |
| 5,973,788 A | * | 10/1999 | Pettersen et al. | .......... 356/614 |
| 6,124,932 A | * | 9/2000 | Tax et al. | .................... 356/614 |
| 6,182,843 B1 | * | 2/2001 | Tax et al. | .................... 212/274 |
| 6,644,485 B1 | * | 11/2003 | Uchida et al. | .............. 212/270 |
| 6,962,091 B1 | * | 11/2005 | Lukas | ........................ 73/865.9 |
| 2004/0149056 A1 | * | 8/2004 | Lukas | ........................ 73/865.9 |
| 2005/0224438 A1 | * | 10/2005 | Maurer et al. | .............. 212/274 |
| 2005/0232626 A1 | * | 10/2005 | Schulte et al. | .............. 396/515 |

FOREIGN PATENT DOCUMENTS

| | | |
|---|---|---|
| DE | 43 15 005 A | 11/1994 |
| DE | 295 11 254 U1 | 10/1996 |
| DE | 198 36 103 A | 2/2000 |
| DE | 694 32 653 | 11/2003 |
| EP | 0 611 211 A | 8/1994 |

* cited by examiner

OTHER PUBLICATIONS

Manfred Lorenz: "Neue Technik auf Hebezeugen", Beispiele—Entwicklungen—Trends; Aus der Praxis für die Praxis; Kontakt & Studium, vol. 607, expert verlag, Renningen, Jul. 4, 2002, pp. 170-172.

*Primary Examiner*—Hoa Q. Pham
(74) *Attorney, Agent, or Firm*—Henry M. Feiereisen

(57) ABSTRACT

In a method for recognition of the position of a load on a lifting gear, an active light source and a camera are mounted to a trolley of the lifting gear. Both, the light source and the camera are directed towards the load. The load has attached thereto at least one marker used for the recognition of the load position and including an active light source. In response to incoming light from the light source on the trolley, the light source of the marker transmits a light signal to the camera.

14 Claims, 5 Drawing Sheets

# METHOD AND DEVICE FOR RECOGNITION OF A LOAD ON A LIFTING GEAR

CROSS-REFERENCES TO RELATED APPLICATIONS

This application is a continuation of prior filed copending PCT International application no. PCT/DE2003/003199, filed Sep. 25, 2003, which designated the United States and on which priority is claimed under 35 U.S.C. §120, and which claims the priority of German Patent Application, Serial No. 102 45 970.3, filed Sep. 30, 2002, pursuant to 35 U.S.C. 119(a)–(d).

BACKGROUND OF THE INVENTION

The present invention relates, in general, to a device and method for recognition of a position of a load on a lifting gear.

Nothing in the following discussion of the state of the art is to be construed as an admission of prior art.

In general a lifting gear is used to lift a load, using ropes or cables. The load may hereby be attached to a load-carrying member, e.g. spreader. In the following description, a reference to "load" generally implies a reference to the load itself or also to the load-carrying member which carries the load.

German patent publication no. DE 198 36 103 A1 describes a crane which includes a trolley for horizontal and/or vertical movement of a load. Mounted to the trolley are several LED spotlights and a camera which can be oriented in the direction of the load. An optical marker is applied on the load and is recorded by the camera.

FIG. 4 shows a schematic illustration of a prior art position recognition device, using a camera C mounted to a trolley T, whereby an active light source LS is associated with the camera C. The light source LS is a spotlight which illuminates a reflector R. The reflector R reflects light, e.g. an infrared beam, back to the camera C. Thus, light has to travel back and forth, i.e. twice the distance between the camera C and the reflector R. The image captured by the camera C is then fed to an image processing system for determining a position or a swinging motion of the load. However, the intensity of incident light in the camera C is slight as a result of the two-way travel of light.

It would be desirable and advantageous to provide an improved method and device for recognition of a position of a load on a lifting gear to obviate prior art shortcomings and to withstand potential adverse environmental effects.

SUMMARY OF THE INVENTION

According to one aspect of the present invention, a method for recognizing a position of a load on a lifting gear having a trolley for moving the load includes the steps of applying to a load at least one marker having a first active light source, orienting a camera on the trolley in a direction toward the load, sending a first light signal from a second active light source on the trolley in a direction of the marker, and sending from the first active light source on the marker a second light signal to the camera in response to a detection of the first light signal.

The provision of a position recognition system according to the present invention is effective in particular when picking up a load, transport a load, or depositing a load. Loads, e.g. a container, that are lifted via cables tend to swing as a consequence of external impacts, like wind, or as a consequence of lateral movements of the load. The position recognition system allows initiation of countermeasures to compensate the load swing because the load position can be ascertained and used as actual variable for compensating the load swing. An actual swing angle can be measured and can be used for suitable measures to counteract a swing impulse.

An active light source is characterized by the ability to generate light and to emit the light in form of light signals. Suitably, the first and second light signals can be transmitted in the form of light in visible range and/or invisible range, e.g. infrared light. As an alternative, the first and second light signals may also be transmitted in the form of flashes. Examples include spotlights which can operate in short periods above permanent load.

According to another aspect of the present invention, a device for recognition of a position of a load on a lifting gear having a trolley for moving the load, includes a first active light source attached to the trolley, a camera attached to the trolley, wherein the first active light source and the camera are oriented in a direction of the load, a light-sensitive sensor for recognizing a light signal emitted from the first active light source, and a marker applied on the load and operatively connected to the sensor, wherein the marker includes a second active light source for sending a light signal to the camera when the sensor detects the light signal from the first active light source.

The arrangement of two active light sources in opposing relationship significantly enhances the operating safety especially under conditions of poor visibility, because light is required to travel only in one-way direction, namely the distance between trolley and load.

According to another feature of the present invention, each of the first and second light sources may be a flash device. The use of flashlight enhances the operational safety of the lifting gear because the position of the load can be positively determined. The light intensity of flash is greatly increased compared to normal spotlight so that adverse conditions, such as poor visibility, e.g., caused by fog, have no significant impact on the position recognition.

By providing an active light source on the trolley and an active light source on the load, it becomes possible to effectively monitor also occurrence of contamination. Contamination of the active light source on the trolley can be monitored by the light-sensitive sensor on the load, whereas the contamination of the active light source on the load can be monitored by determining the brightness of light impacting the camera. Thus, the degree of contamination of the active light sources and/or camera and/or light-sensitive sensor can be ascertained for implementing a safe operation because effective measures for cleaning can be initiated in time.

The light signal transmitted from the active light source may be in the visible range and/or invisible range. Use of invisible light, e.g. infrared light, has the advantage that a person in the area of the light signal is not exposed to any glare.

As noted above, the light signals from the direction of the trolley are recognized by a light-sensitive sensor which may be located in an area of the marker on the load.

When using a flash device as light source, less energy is consumed compared to a traditional spotlight, while realizing a higher energy density of the light signal. Implementation of a higher energy density allows safer position recognition. The flash signal allows also transmission of data between the trolley and the load, e.g. by using the flash sequence and/or the flash length. Examples of data may involve information about the lifted load such as: origin, destination, storage location, etc. When the load has two markers, the flash sequence and/or flash length can be used to distinguish between the markers. This information to distinguish markers results in a quicker and more precise position determination of the load.

Another advantage of using flash is the ability to measure a distance between the trolley and the load in response to an operating time of the light signals.

The application of a flash as light signal also allows high scanning rates of the marker for position determination on the load. The result is less measurement noise in the camera and more precise measurement of the position. Reduced measurement noise may also be realized by high light intensity of the flash signal.

In order to further increase incident light in the camera, the marker may include a light reflector. As a result, also the flash emitted from the active light source on the trolley can be deflected back to the camera. This enhances operational safety of the position determination.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
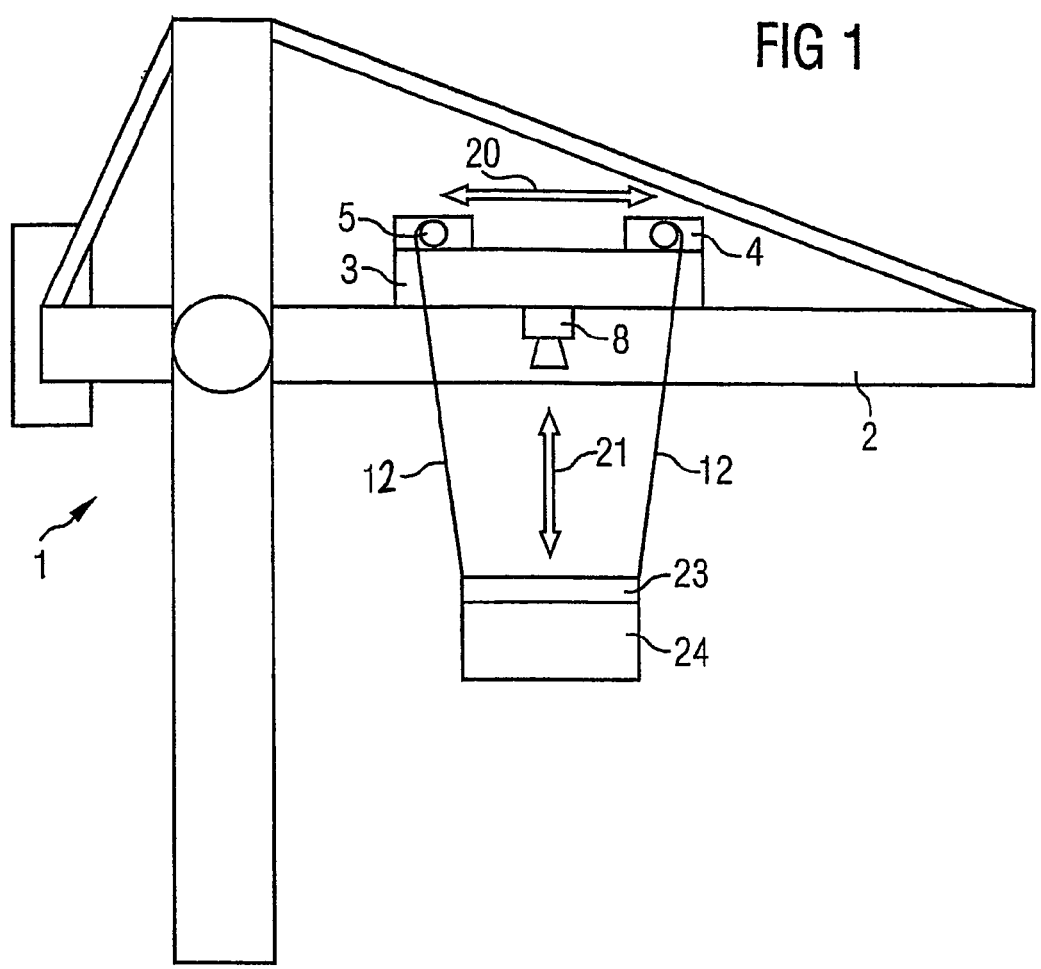
FIG. 1 is a schematic side view of a lifting gear in the form of an exemplary crane having incorporated therein the subject matter of the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of three applications, all filed on the same day. These applications deal with related inventions. They are commonly owned and have same or different inventive entities. These applications are unique, but incorporate the others by reference. Accordingly, the following U.S. patent application is hereby expressly incorporated by reference: "METHOD AND DEVICE FOR DETERMINING A SWINGING MOTION OF A LOAD SUSPENDED FROM A LIFTING GEAR" by co-inventors Peter Schulte, Peter Maurer, and Ingbert Strebel, and "METHOD AND DEVICE FOR MAINTAINING A POSITION OF A LOAD SUSPENDED FROM A LIFTING GEAR", by co-inventors Peter Maurer and Peter Schulte.

Turning now to the drawing, and in particular to FIG. 1, there is shown a side view of a crane generally designated by reference numeral 1. The crane 1 includes a boom 2 and a trolley 3 movable along the boom 2 in a travel direction, as indicated by a double arrow 20. The trolley 3 includes a hoist mechanism for lifting a load 24 in a direction, as indicated by a double arrow 21. The hoist mechanism has four lifting units 4, with each of the lifting units 4 equipped with a cable drum 5. In the illustration of FIG. 1, only two of the four lifting units 4 are visible, with the other lifting units 4 obscured from view. The crane 1 represents an exemplary lifting gear, which is equipped with a camera 8 for determining a position of the load 24 or a position of a load-carrying member 23, for example a spreader for a container.

Figure 2:
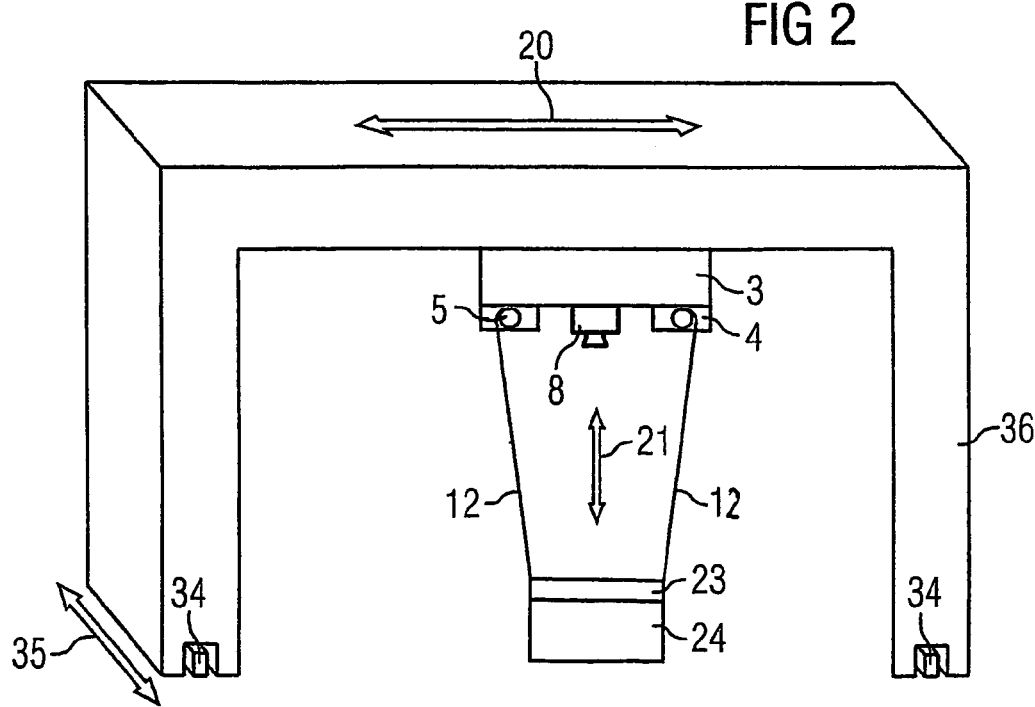
FIG. 2 is a schematic illustration of a lifting gear in the form of an exemplary gantry having incorporated therein the subject matter of the present invention.

FIG. 2 shows a side view of another exemplary lifting gear, such as a gantry 36 for loading and unloading containers. The gantry 36 includes a trolley 3 and a hoist mechanism for lifting a load 24. Parts corresponding with those in FIG. 1 are denoted by identical reference numerals. The hoist mechanism includes four lifting units 4, each equipped with a cable drum 5, whereby again only two of the four lifting units 4 are visible in FIG. 2. While FIG. 2 shows the gantry 36 movable along a rail 34 in a travel direction indicated by double arrow 35, it is, of course, also conceivable to construct a mobility of the gantry 36 without rails. As the trolley 3 and/or the gantry 36 travel and as the load 24 or the load-carrying member 23 is lifted and lowered in lifting direction 21, also the gantry 36 may encounter a swinging motion of the load 24 and/or the load-carrying member 23, e.g. rotation (skew) swing. In the following description, the term "swinging motion" or "swing" will be used in a generic sense and is used synonymously and interchangeably with rotation, wobble and/or skew motion or slewing motion.

The gantry 36 is equipped with a camera 8 secured in the area of the trolley 3 for determining the load position and thus a swinging motion.

Figure 3:
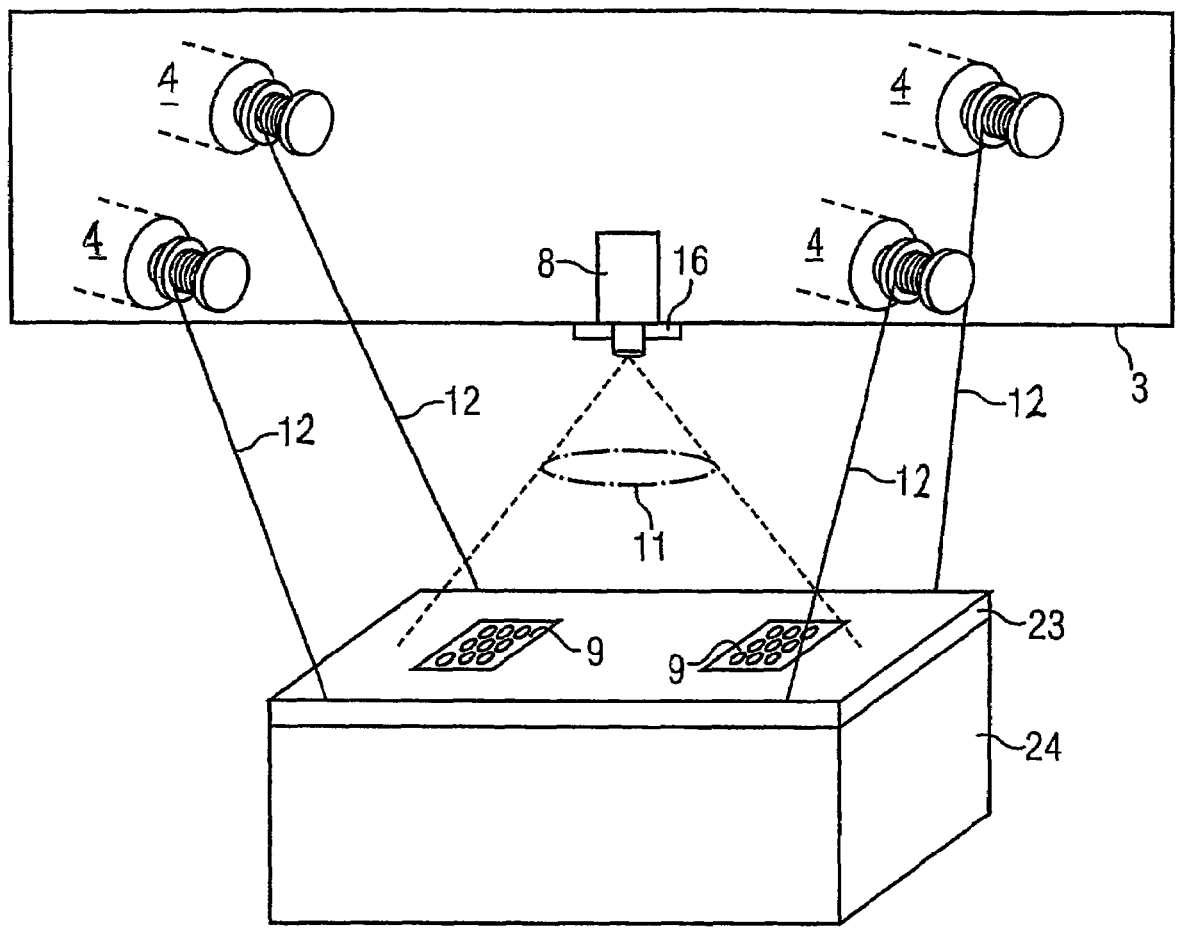
FIG. 3 is a schematic illustration of a trolley of the lifting gear with suspended load.
Figure 4:
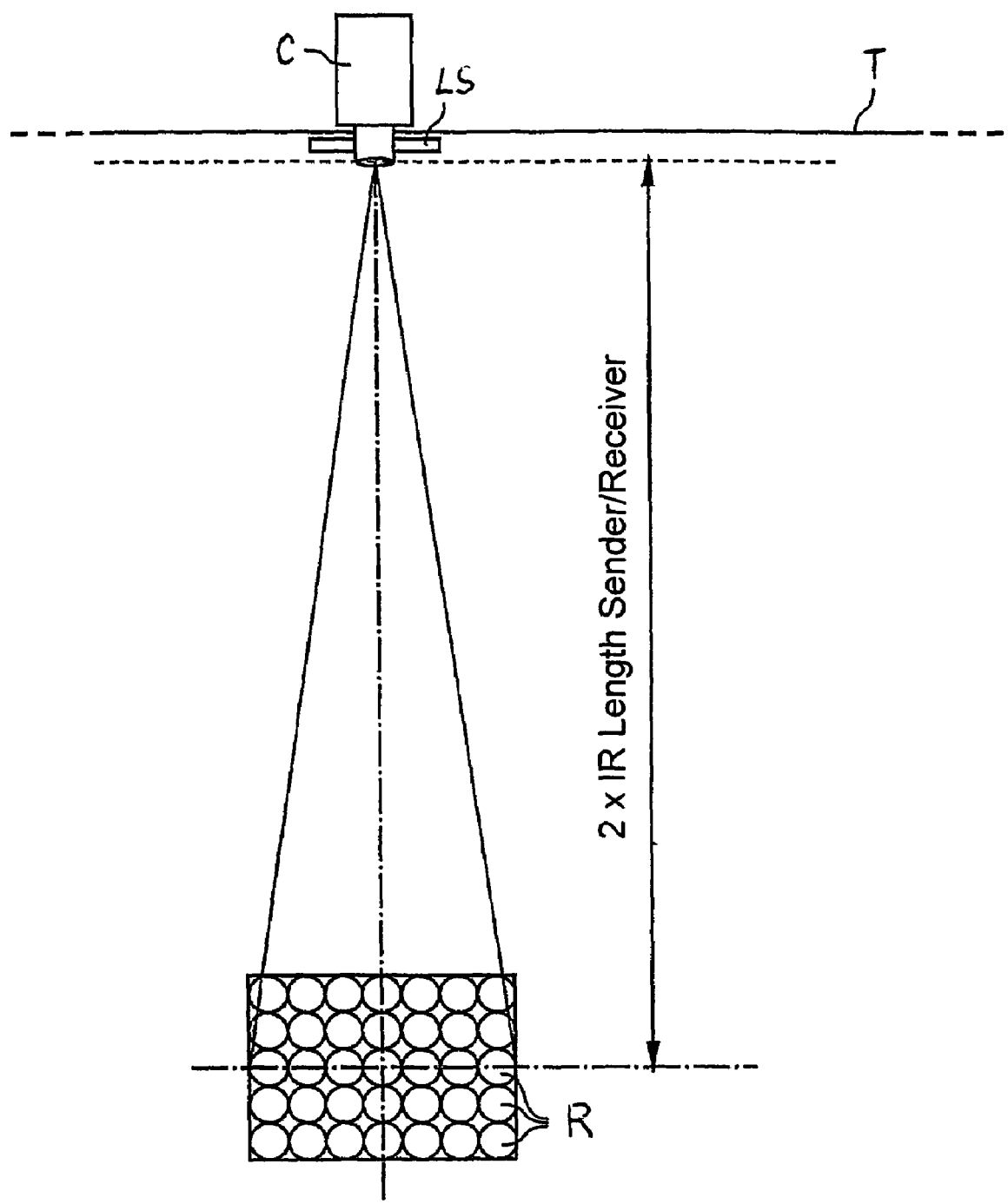
FIG. 4 is a schematic illustration of a prior art position recognition device.

FIG. 3 shows a perspective illustration of the arrangement of the four lifting units 4 and the four cable drums 5. Suspended from the trolley 3 via cables 12 is a load-carrying member 23 with attached load 24. The lengths of the cables 12 can be adjusted by the lifting units 4 to compensate for any slack in the cables 12 and to maintain the load 24 in proper alignment. The camera 8 captures an image field 11 of the load 24 whereby the image field 11 expands in the direction of the load 24. An active light source 16, for example an infrared light beam, is associated with the camera 8. Applied on the load-carrying member 23 are two markers 9 which can be recognized by an image processing system in response to the image recorded by the camera 8.

Figure 5:
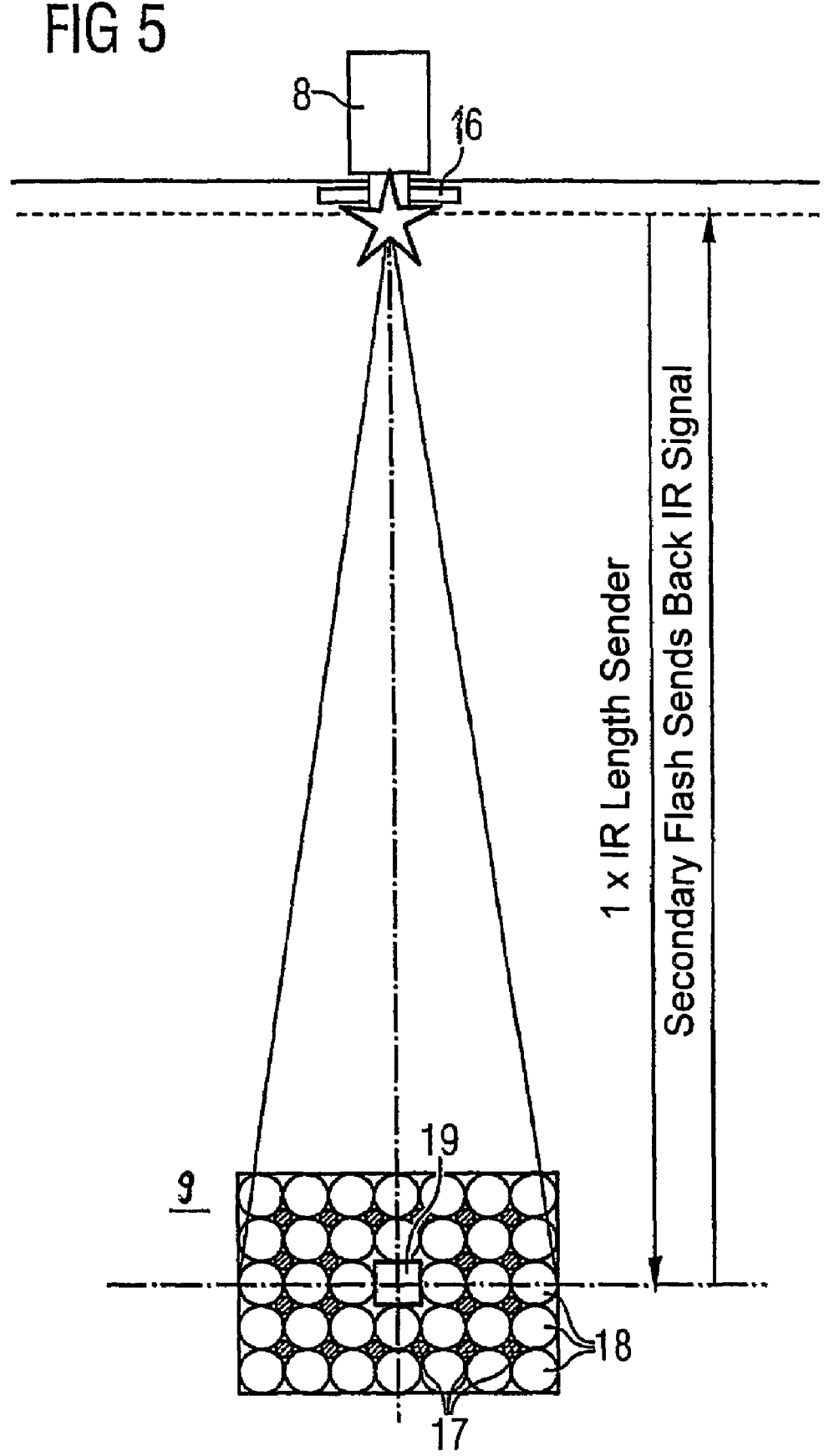
FIG. 5 is a schematic illustration of a position recognition device according to the present invention.

Referring now to FIG. 5, there is shown a more detailed illustration of a position recognition device according to the present invention for identifying a position of a load. The position recognition device includes the camera 8 and the active light source 16, which is disposed adjacent to the camera 8, whereby both, the camera 8 and the light source 26, are oriented toward the load which has applied thereon a marker 9. The marker 9 is constructed to have an active light source 17 comprised of one or more light sources.

While the active light source 17 per se may form the marker 9, it is also possible to optionally provide the marker 9 with additional passive reflectors 18, as shown in FIG. 5, to further enhance the light intensity captured by the camera 8. When the light source 16 sends light in the direction of the marker 9, incident light is detected by a light-sensitive sensor 19 which may be disposed in proximity of the marker 9 on the load. In response to the detection of light by the sensor 19, the active light source 17 of the marker 9 emits light in the direction of the camera 8. The light sources 16, 17 may operate in synchronism with the camera 8.

The light emitted by the light sources 16, 17 may be light in visible range and/or invisible range. In the event the light signal from the light source 16 is a flash, the light source 17 emits a secondary flash. Thus, light of either one of the light sources 16, 17 needs to travel only one way to reach the destination.

Figure 6:
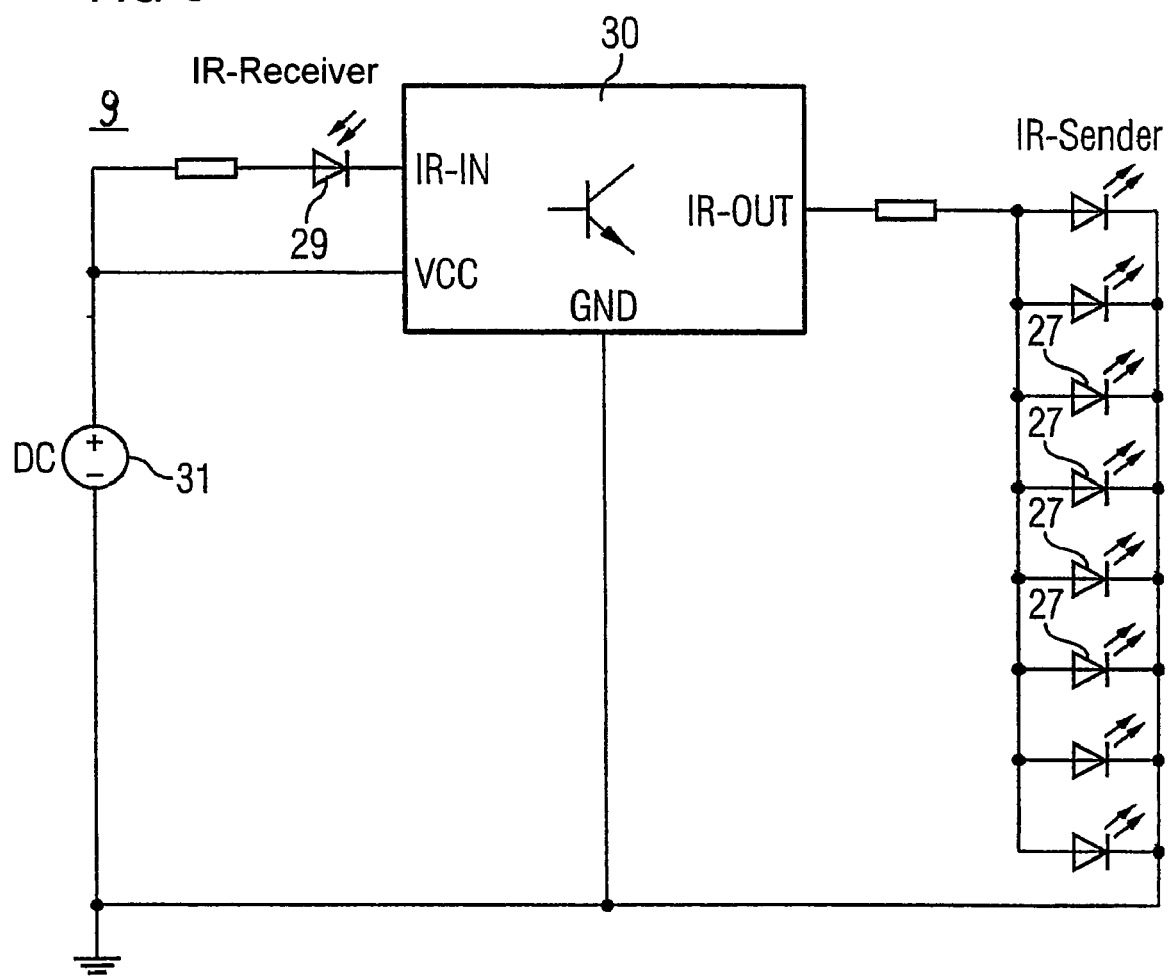
FIG. 6 is a schematic circuit diagram of a basic hardware construction of a marker of the position recognition device of FIG. 5.

FIG. 6 is a schematic circuit diagram of a basic hardware construction of the marker 9 of the position recognition device of FIG. 5. An infrared light-sensitive IR-receiver 29 receives a light signal from the active light source 16 adjacent to the camera 8. The sensor 19 includes an evaluation system 30 to control the active light source 17 of the marker 9. The active light source 17 can be realized by a plurality of infrared senders 27. Power supply is provided by a DC source 31, for example.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for recognizing a position of a load on a lifting gear having a trolley for moving the load, comprising the steps of:
    applying to a load at least one marker having a first active light source;
    orienting a camera on the trolley in a direction toward the load;
    sending a first light signal from a second active light source on the trolley in a direction of the marker; and
    sending from the first active light source on the marker a second light signal to the camera in response to a recognition of the first light signal.

2. The method of claim 1, wherein the first and second light signals are transmitted in the form of flashes.

3. The method of claim 2, and further comprising the step of distinguishing the presence of two of said marker on the load in response to a sequence of flashes.

4. The method of claim 2, and further comprising the step of distinguishing the presence of two of said marker on the load in response to a length of flashes.

5. The method of claim 2, and further comprising the step of measuring a distance between the trolley and the load in response to an operating time of the flashes.

6. The method of claim 1, wherein the first and second light signals are transmitted in the form of light in visible range and/or invisible range.

7. The method of claim 1, wherein the recognition of the first light signal incoming from a direction of the trolley is realized by a light-sensitive sensor operatively connected to the marker.

8. The method of claim 7, and further comprising the step of ascertaining a contamination of the second light source in response to an operation of the sensor on the marker.

9. The method of claim 1, and further comprising the step of ascertaining a contamination of the first light source in response to a brightness of incident light in the camera.

10. A device for recognition of a position of a load on a lifting gear having a trolley for moving the load, comprising:
    a first active light source attached to the trolley;
    a camera attached to the trolley, wherein the first active light source and the camera are oriented in a direction of the load;
    a light-sensitive sensor for recognizing a light signal emitted from the first active light source; and
    a marker applied on the load and operatively connected to the sensor, said marker including a second active light source for sending a light signal to the camera, when the sensor detects the light signal from the first active light source.

11. The apparatus of claim 10, wherein each of the first and second light sources is a flash device.

12. The apparatus of claim 10, wherein each of the first and second light sources is an infrared source.

13. The apparatus of claim 10, wherein the marker includes a light reflector.

14. The apparatus of claim 10, wherein the light-sensitive sensor is located in an area of the marker.

\* \* \* \* \*

UNITED STATES PATENT AND TRADEMARK OFFICE
CERTIFICATE OF CORRECTION

| | |
|---|---|
| PATENT NO. | : 7,137,771 B2 |
| APPLICATION NO. | : 11/093029 |
| DATED | : November 21, 2006 |
| INVENTOR(S) | : Peter Maurer et al. |

It is certified that error appears in the above-identified patent and that said Letters Patent is hereby corrected as shown below:

<u>Title Page (73) Assignee:</u>   Change "Müchen" to --München--

Signed and Sealed this

Thirtieth Day of January, 2007

JON W. DUDAS
*Director of the United States Patent and Trademark Office*